US006947907B1

(12) United States Patent
Silverman (10) Patent No.: US 6,947,907 B1
(45) Date of Patent: Sep. 20, 2005

(54) PROCESS FOR MANAGING OWNERSHIP OF A VALUABLE ITEM

(76) Inventor: John Edward Silverman, 5013 Vista Del Monte, El Paso, TX (US) 79922

( * ) Notice: Subject to any disclaimer, the term of this patent is extended or adjusted under 35 U.S.C. 154(b) by 0 days.

(21) Appl. No.: 09/353,723

(22) Filed: Jul. 14, 1999

(51) Int. Cl.[7] .............................................. G06F 17/60
(52) U.S. Cl. ......................................... 705/40; 705/35
(58) Field of Search .............................. 705/26, 35–40, 705/1

(56) References Cited

U.S. PATENT DOCUMENTS

| | | | | |
|---|---|---|---|---|
| 4,974,878 | A | * | 12/1990 | Josephson ..................... 283/67 |
| 5,124,935 | A | | 6/1992 | Wallner et al. .............. 364/525 |
| 5,220,501 | A | * | 6/1993 | Lawlor et al. .............. 364/408 |
| 5,694,552 | A | | 12/1997 | Aharoni ....................... 395/237 |
| 5,745,706 | A | * | 4/1998 | Wolfberg et al. ........... 395/235 |
| 5,893,904 | A | * | 4/1999 | Harris et al. .................. 705/27 |
| 5,983,238 | A | * | 11/1999 | Becker et al. .............. 705/104 |
| 6,052,674 | A | * | 4/2000 | Zervides et al. .............. 705/40 |
| 6,148,293 | A | * | 11/2000 | King ........................... 705/35 |
| 6,192,347 | B1 | * | 2/2001 | Griff ........................... 795/36 |
| 6,208,978 | B1 | * | 3/2001 | Walker et al. ................ 705/38 |
| 6,239,867 | B1 | * | 5/2001 | Aggarwal ..................... 356/30 |
| 6,263,320 | B1 | * | 7/2001 | Danilunas et al. ............ 705/35 |
| 6,347,302 | B1 | * | 2/2002 | Joao .............................. 705/4 |

FOREIGN PATENT DOCUMENTS

EP      0 905 601 A1      3/1999

OTHER PUBLICATIONS

Halladay S. D. et al., the Handbook of Equipment Leasing, Amembal and Halladay, , Salt Lake, UT, 1995. pp. 798 and 843 845.*
DeMarrais, Kevin G, "Price of Used Cars Falling As Leases Come To An End", The Record, Bergen County, NJ: Apr. 9, 1998, describes the falling prices of used vehicles and the buying or leasing options of a customer.

* cited by examiner

Primary Examiner—Frantzy Poinvil
(74) Attorney, Agent, or Firm—Lowell W. Gresham; Jordan M. Meschkow; Meschkow & Gresham, P.L.C.

(57) ABSTRACT

An ownership management process (32) is practiced with the aid of a computer system (18) having access to a database (38) which includes data describing any number of leases. The subject of a lease is a valuable item (10). A merchant (12) leases the item (10) for a lease term to a customer (14). Throughout the lease term, the customer (14) may return the item (10) and be relieved of any further obligation to make lease payments to the merchant (12). Moreover, the customer (14) may make voluntary contributions (74, 76) to a reserve credit account (70) that is associated with the lease. The merchant also makes matching contributions (78) to the customer's reserve credit account (70) at a predetermined contribution rate. The customer (14) may purchase the item (10) during the term of the lease for a price set forth in the lease using the customer's RCA funds, but has no obligation to do so. Alternatively, the customer (14) may purchase another item offered by the merchant (14) using the customer's RCA funds.

20 Claims, 7 Drawing Sheets

| SELECTED LEASE PROVISIONS |
|---|
| ESTABLISH LEASE TERM (1 YEAR MINIMUM, 10 YEAR MAXIMUM). |
| SET PURCHASE PRICE, PREFERABLY ABOVE THE FELONY LEVEL. |
| OBLIGATE CUSTOMER TO PURCHASE INSURANCE WHICH NAMES MERCHANT AS LOSS PAYEE. |
| OBLIGATE CUSTOMER TO MAKE PERIODIC (MONTHLY) LEASE PAYMENTS TO MERCHANT. |
| BESTOW ON CUSTOMER AN OPTION TO PURCHASE THE ITEM AT THE PURCHASE PRICE DURING THE TERM OF THE LEASE. |
| BESTOW ON CUSTOMER AN OPTION TO TERMINATE THE LEASE PRIOR TO THE MINIMUM LEASE TERM BY PAYING AN EARLY TERMINATION FEE. |
| REMOVE LEASE PAYMENT OBLIGATION UPON RETURN OF THE ITEM. |
| REFUND RCA FUNDS, LESS MATCHING FUNDS AND PENALTY (25%), IF CUSTOMER MAKES NO SECONDARY TRANSACTION WITHIN A PREDETERMINED PERIOD OF TIME (24 MONTHS). |
| RCA FUNDS ARE VOLUNTARILY CONTRIBUTED BY CUSTOMER, MATCHED AT SOME PERCENTAGE (10% PER ANNUM) BY MERCHANT, AND USABLE BY CUSTOMER TO PURCHASE ANY ITEM, INCLUDING BUT NOT LIMITED TO THE LEASED ITEM. |

PROCESS FOR MANAGING OWNERSHIP OF A VALUABLE ITEM

TECHNICAL FIELD OF THE INVENTION

This invention relates to processes used to control the ownership of valuable items. More specifically, the present invention relates to a process for exerting ownership-type rights in a valuable item that have been divided between a merchant and a customer so that the market for the valuable item operates efficiently and to a computerized system used in carrying out the process.

BACKGROUND OF THE INVENTION

In a simple sales transaction involving an item, a merchant has nearly complete ownership rights prior to selling the item to a customer. These ownership rights generally include the right to possess and use the item, the right to risk damaging or losing the item and the right to transfer ownership of the item to a third party. When the customer purchases the item, these rights are then transferred to the customer in exchange for the payment of money to the merchant, and the merchant has no further ownership-type interest in the item.

However, many transactions involving valuable items are not so simple, particularly when the customers are members of the general public rather than repeat business clients. In such transactions, the item cost in a simple sales transaction is so high that customers cannot easily pay the sums of money involved. Hence, merchants and customers are desirous of alternate types of transactions that allow customers to immediately enjoy some ownership rights, such as the right to possess and use, in exchange for immediate payment of less money.

Accordingly, installment sales and traditional financing are often used as alternate types of transactions. With such arrangements, the customer typically receives all ownership rights, except that a security interest is reserved for the merchant or entity providing financing. For convenience, no distinction is made below between a merchant and a financing entity or other middle man, and all such entities will be referred to individually and collectively as the merchant. Typically, the customer pays a small portion of the total price initially and periodic payments over time. The total sum paid over time is usually much greater than would have been paid in a simple sales transaction due in part to routine interest paid on the merchant's investment.

Unfortunately, a security interest in the item in combination with a mere routine interest payment does not adequately compensate the merchant. Consequently, merchants typically demand either a high interest rate or a high sales price, or both, in order to be adequately compensated.

One situation in which a security interest and routine pricing do not adequately compensate a merchant occurs when a customer declares bankruptcy. Typically, if a customer declares bankruptcy, the merchant becomes just another creditor in the pool all the customer's creditors. With this status, the merchant can expect to receive only pennies on the dollar for the merchant's investment, and that only after expending considerable administrative time and effort.

Another situation where a security interest and routine pricing do not adequately compensate a merchant occurs when the customer fails to honor its obligation to make future payments. Then, the merchant must either write-off the item or file a civil law suit, both of which increase a merchant's costs. Accordingly, pricing is typically increased to compensate for the merchant's increased risks of a customer declaring bankruptcy or otherwise failing to honor its future payment obligations.

Another alternative to a simple sales transaction is a lease, or lease-to-buy arrangement. In a pure lease, the customer makes periodic payments in exchange for the rights to possess and use the leased item for a period of time. However, the customer has no ability to obtain further ownership rights, such as the right to transfer the item to a third party. With certain types of items, such as non-depreciating items, customers view this alternative as being unacceptable because they cannot enjoy item appreciation. In other types of items, periodic payments are typically set sufficiently high to offset worst-case depreciation, and the customer often pays more than would be paid with other simple sales transaction alternatives.

In a lease-to-buy arrangement, a customer is often given an option to buy the leased item at a set residual price at the end of the lease term. The residual price is typically much less than the purchase price would be for a simple sales transaction, and is often a trivial amount, such as $1.00. However, such lease-to-buy arrangements are typically convertible into an installment sale should the customer declare bankruptcy. Consequently, the merchant must increase pricing to compensate for the increased risk of potential customer bankruptcy.

The above-discussed alternatives to a simple sales transaction pose a problem to the customer of having to pay undesirably high prices, all factors considered. Yet another problem for the customer with these alternatives is that they limit a customer's ability to either remove future payment obligations or exchange the item for another item that may better meet the customer's needs at some future date.

SUMMARY OF THE INVENTION

Accordingly, it is an advantage of the present invention that an improved process for managing the ownership of a valuable item is provided.

Another advantage is that a computer system is provided to manage the ownership of valuable items about which a merchant has certain ownership rights and customers have certain future obligations and ownership rights.

Another advantage is that a process is provided which improves the efficiency with which the markets for certain valuable items operate.

Another advantage is that a process is provided which allows a merchant to receive adequate compensation while pricing certain items low and obligating customers to make future payments.

Another advantage is that a process is provided which allows a customer to have immediate possession and use of certain items and gives the customer flexibility in future dealings concerning the items.

The above and other advantages of the present invention are carried out in one form by a new and useful process for managing ownership of a valuable item involved in a first financial transaction between a merchant and a customer. The process calls for leasing the item to a customer in the first financial transaction so that the customer is thereafter obligated to make periodic lease payments to the merchant. A reserve credit account (RCA) is established with the merchant. The accumulation of funds is recorded in the RCA in response to payments voluntarily given to the merchant by the customer. The customer and merchant then engage in a second financial transaction involving either the item which was the subject of the first transaction or another item, at the option of the customer. This second transaction causes funds recorded in the customer's RCA to be reduced.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
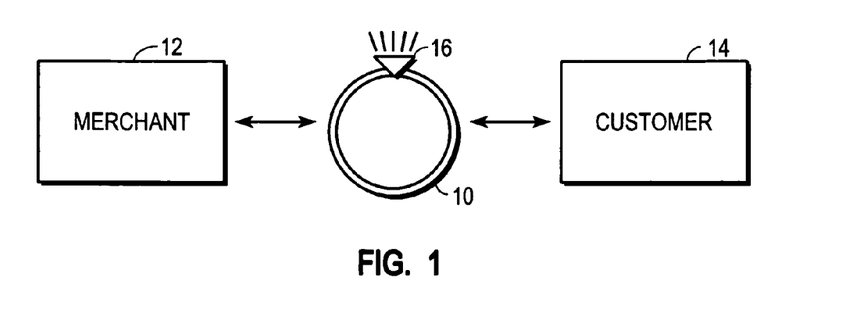
FIG. 1 shows a schematic block diagram depicting an exemplary item which is the subject of one or more transactions between a merchant and a customer.

FIG. 1 shows a schematic block diagram depicting an exemplary item 10 which is the subject of one or more transactions between a merchant 12 and a customer 14. In a typical scenario, item 10 is initially owned by merchant 12. As a result of the one or more transactions, various ownership rights in item 10, such as rights of possession and use, are given to customer 14 in exchange for payments made by customer 14 to merchant 12.

In the preferred embodiment, item 10 is an object that is in commerce and is most likely non-depreciating. In other words, the fair market value of item 10 is likely to increase in upcoming months so long as item 10 does not suffer significant damage. Hence, FIG. 1 illustrates item 10 as an item of jewelry, such as a ring which includes one or more gemstones 16. However, item 10 is not limited to jewelry and may, for example, be fine art or other objects whether or not such other objects are non-depreciating.

In addition, in the preferred embodiment item 10 is a valuable item with a fair market value so high that the theft of item 10 would be considered a felony in the jurisdiction where customer 14 resides. This value varies among jurisdictions, but is generally greater than $1000. Accordingly, the theft of item 10 would be considered a criminal activity of significant importance.

Merchant 12 is defined herein to include any legal entity or collection of entities that have substantially complete ownership rights in item 10 prior to engaging in transactions with customer 14 over item 10. Accordingly, merchant 12 may include one or more of an individual, a traditional store, an internet store, a store creditor, another financing organization, a middle man, and the like. Conversely, customer 14 is defined herein to include any legal entity or collection of entities that are engaging in one or more transactions with merchant 12 to obtain certain rights in item 10. Customer 14 may include one or more of an individual, business, institution, non-profit organization, and the like. While FIG. 1 shows only a single item 10 and a single customer 14, those skilled in the art will appreciate that a single merchant 12 may have a multiplicity of items 10 and customers 14.

Figure 2:
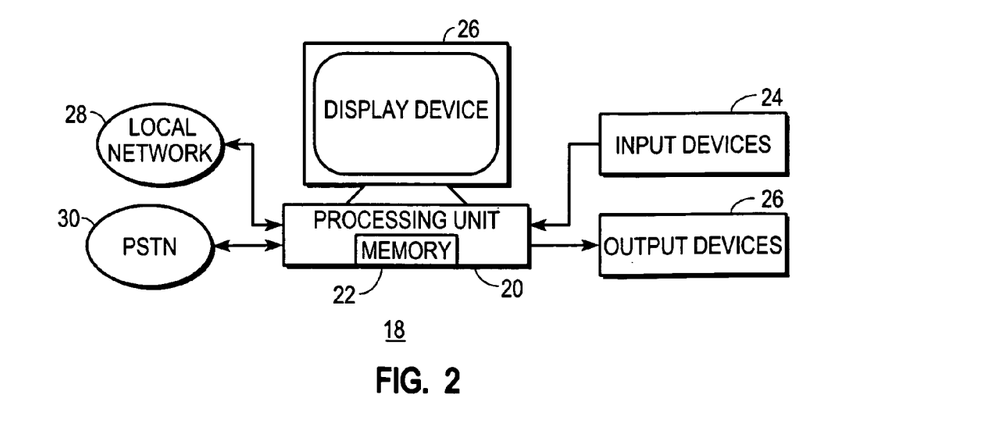
FIG. 2 shows a block diagram of a computer system which is useful in implementing a process for managing ownership of the item in accordance with a preferred embodiment of the present invention.

FIG. 2 shows a block diagram of a computer system 18 which is useful in implementing a process for managing ownership of item 10 (FIG. 1) in accordance with a preferred embodiment of the present invention. Computer system 18 includes a processing unit 20, a portion of which is a memory device 22. Processing unit 20 couples to various input devices 24, such as a mouse, keyboard, and the like, and output devices 26, such as a printer and a display device. In addition, processing unit 20 optionally couples to a local area network 28 and/or the public switched telecommunications network (PSTN) 30. Through local network 28, processing unit 20 may access or act as a server. Through PSTN 30, processing unit 20 may access and participate in the Internet. Processing unit 20 performs tasks (discussed below) to control a database (discussed below) used in implementing the process for managing the ownership of item 10. Such tasks may be determined by a computer program residing in memory 22 and such a database may be stored in memory 22. Alternatively, such tasks and database may be located in another computer device accessible to processing unit 18 through local network 28 or PSTN 30.

Figure 3:
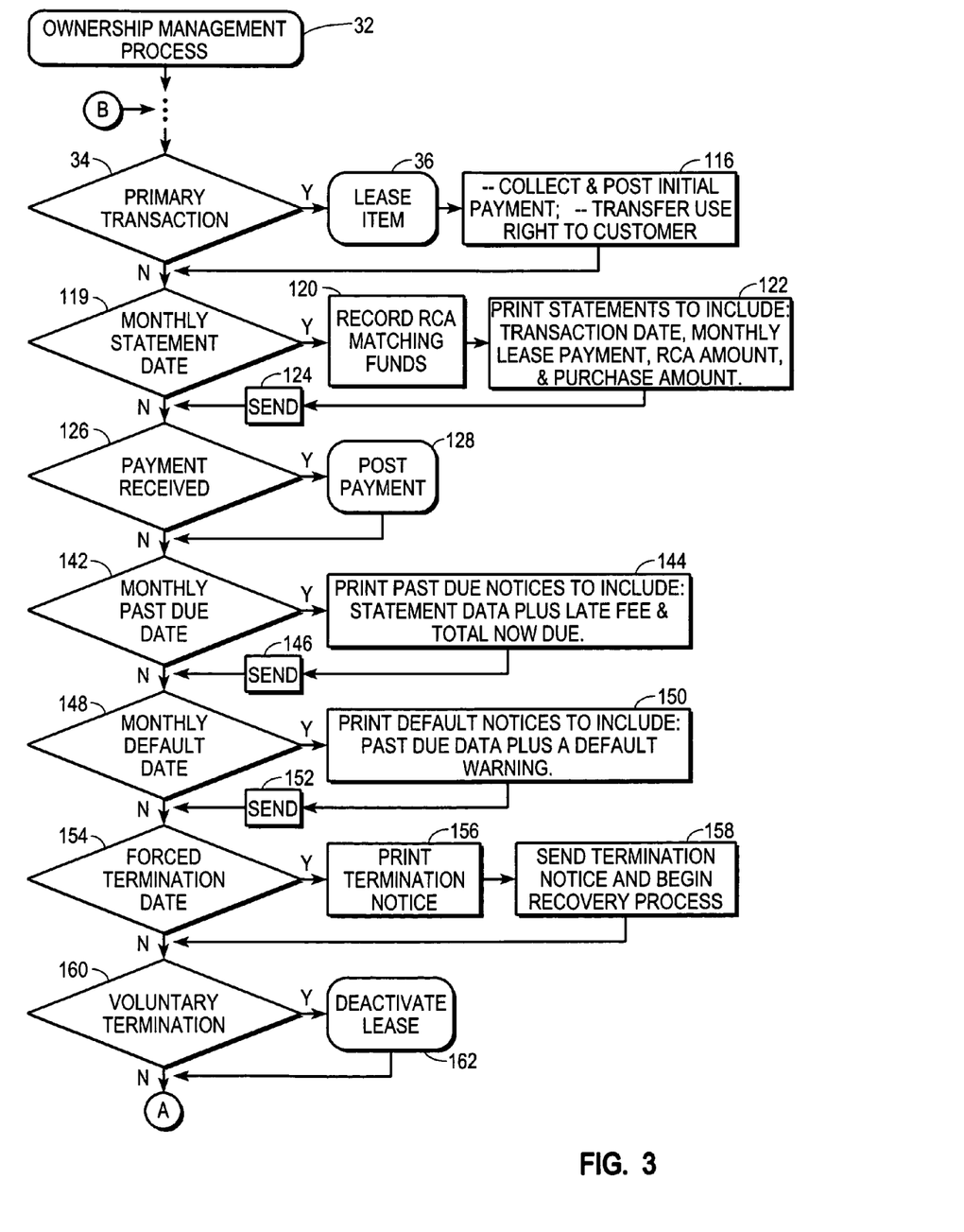
FIG. 3 shows a flow chart of a first portion of the ownership management process.

FIG. 3 shows a flow chart of a first portion of an ownership management process 32. Process 32 may be performed with the aid of computer system 18 (FIG. 2) and under the control of merchant 12 (FIG. 1). For the sake of clarity, the flow chart of FIG. 3 and other flow charts discussed below include steps, tasks and activities which may be a part of process 32 but which need not be completely performed within computer system 18. Moreover, those skilled in the art can easily devise alternate sequencing and task organization than specifically depicted herein without departing from the spirit of the present invention.

As indicated by ellipsis in FIG. 3, process 32 may include any number of tasks not directly relevant to the present discussion or already well understood by those skilled in the art of applying computer automation to financial transactions. Such tasks may, for example, relate to preparing daily reports or any other database inquiry as may be needed from time to time. Eventually, a query task 34 is performed. Query task 34 determines whether a primary transaction is occurring.

For the purposes of the present invention, a primary transaction is a transaction between merchant 12 and customer 14 (FIG. 1) which does not involve the use of reserve credit account (RCA) funds. RCA's are discussed in detail below. For the present discussion a transaction with a new customer 14 would be an example of a primary transaction, but primary transactions are not limited to new customers. Moreover, primary transactions are considered to be primary only in distinction to secondary transactions, discussed below. Secondary transactions involve the use of RCA funds and are no less important than primary transactions.

Figure 4:
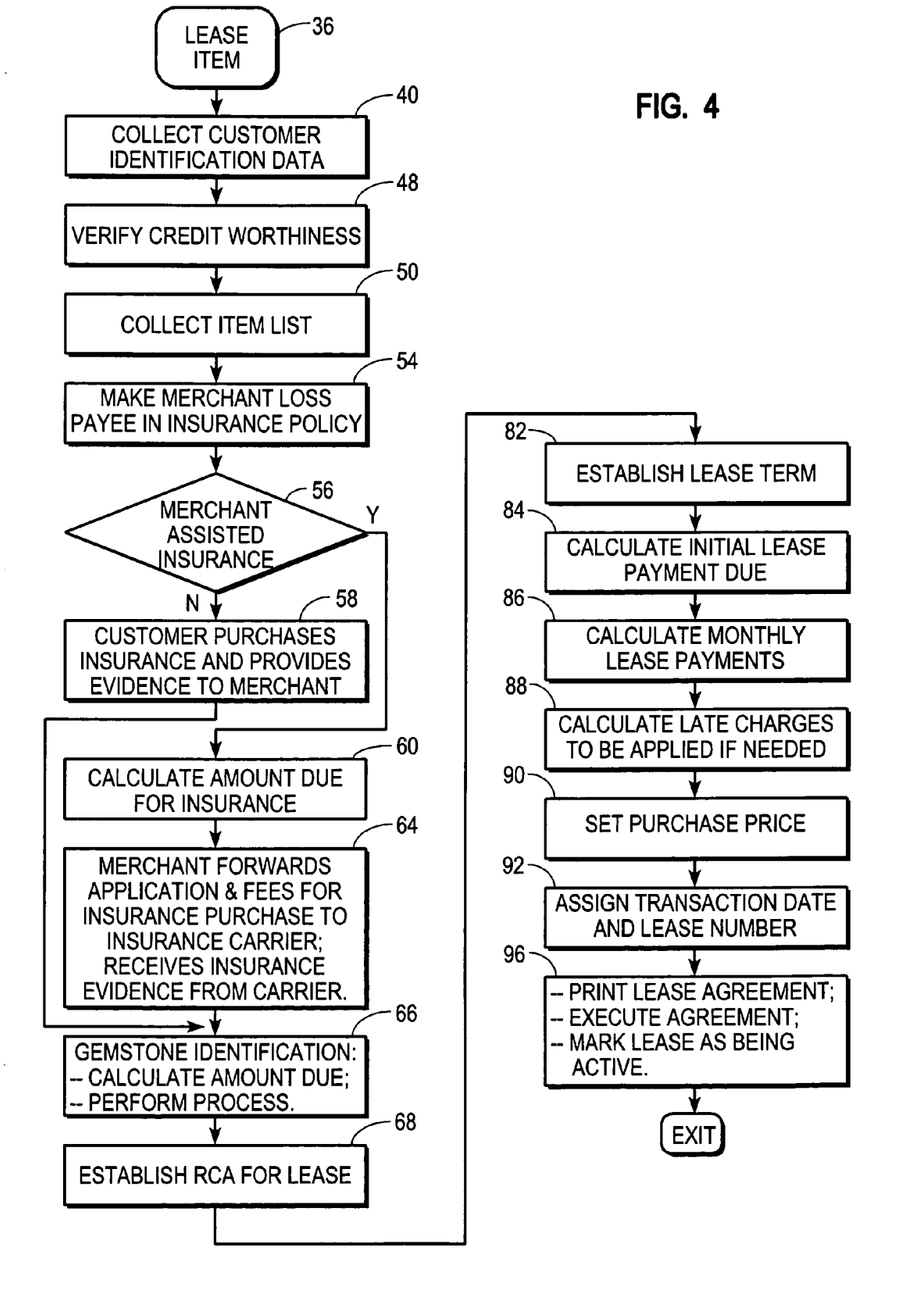
FIG. 4 shows a flow chart of an item-leasing segment of the ownership management process.
Figure 5:
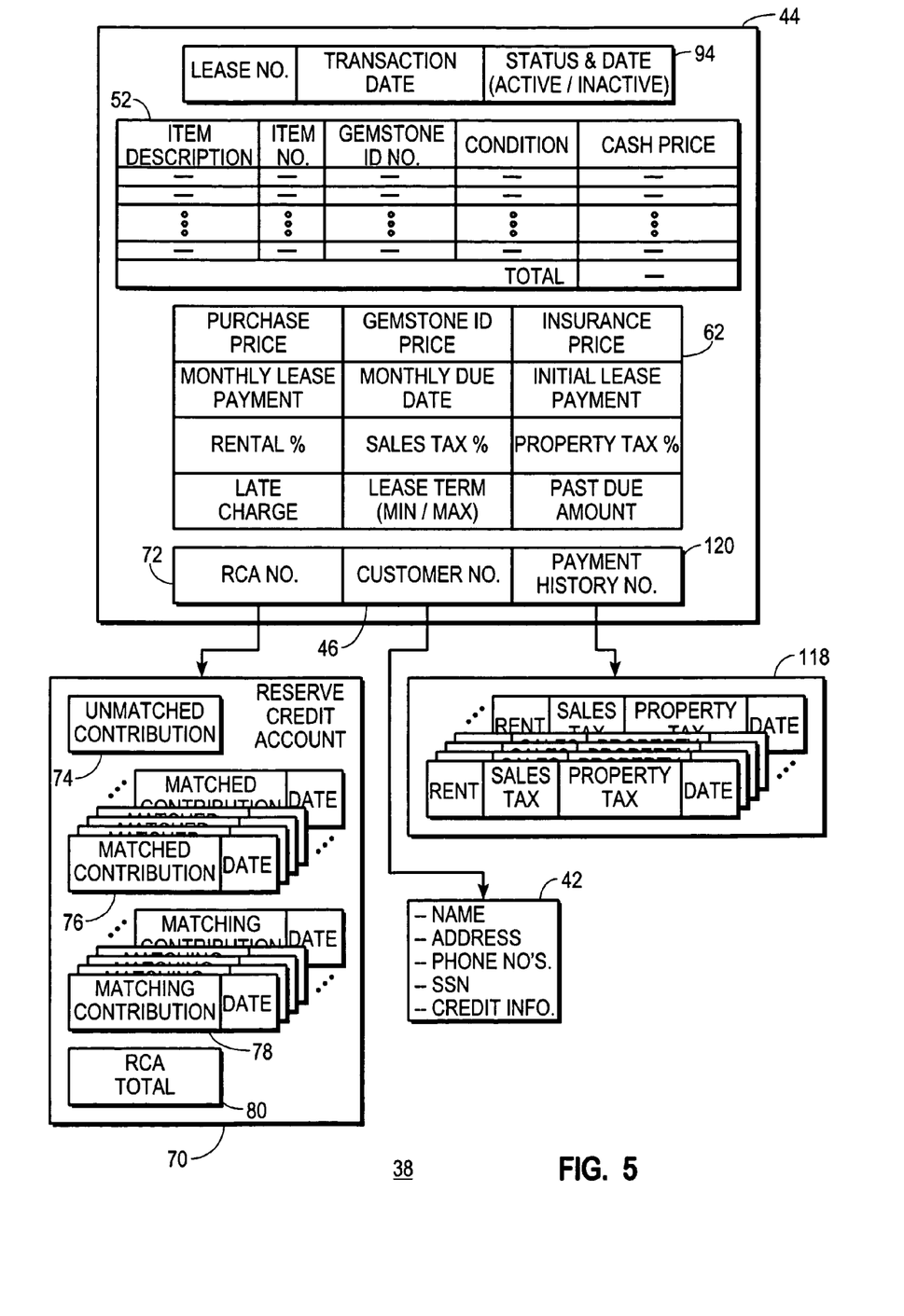
FIG. 5 shows a block diagram of an exemplary database which may be implemented in support of the ownership management process.

When a primary transaction is occurring, an item-leasing segment 36 of process 32 is performed. A flow chart of item-leasing segment 36 is shown in FIG. 4. FIG. 5 shows a block diagram of an exemplary database 38 which may be implemented in support of ownership management process 32.

Referring primarily to FIGS. 4-5, item-leasing segment 36 performs a task 40 to collect customer identification data 42. Data 42 desirably includes the full name, address, phone numbers and social security number of customer 14. Data 42 may be included in database 38 and linked to a lease set-up table 44 by assigning a customer number 46. After task 40, a task 48 is performed to verify the credit worthiness of customer 14. Task 48 may be performed in part over phone lines and/or the Internet by transferring the customer identification data collected above in task 40 to a credit bureau and receiving credit worthiness information in return. Such credit information may be saved with data 42 in database 38. The flow chart of FIG. 4 assumes that the credit information indicates that customer 14 is acceptable to merchant 10. Otherwise, process 32 may cease at this point with respect to this particular customer 14.

After verifying credit worthiness, a task 50 is performed to collect item list 52. Item list 52 forms a part of lease set-up table 44 and generally provides information about item 10. Preferably, the transaction for which item-leasing segment 36 is being performed can involve any number of items 10, and item list 52 is therefore configured to organize information for all such items 10. Such information may include textual descriptions of items 10 along with identifying serial or inventory numbers for items 10. In addition, indications of the conditions of items 10 are desirably provided along with itemized cash prices for items 10. A total for the transaction represents the sum of cash prices for all items 10 involved in the transaction. For the sake of simplicity, the following discussion will focus on a single item 10, even though other items 10 may be involved in the transaction.

While not necessarily collected during task 50, gemstone identification (ID) numbers are also included in item list 52 for item 10. As discussed above, item 10 may include gemstone 16. In the preferred embodiment, a gemstone identification process is performed for gemstone 16 to provide a data set (not shown) which can be later used to physically identify gemstone 16. The data set is obtained as a result of optically scanning gemstone 16. One example of such a gemstone identification process is presented in U.S. Pat. No. 5,124,935 entitled "Gemstone Identification, Tracking and Recovery System," assigned to Omphalos Recovery Systems, Inc. of Toronto, Canada. The gemstone ID number included in item list 52 identifies the data set. However, this ID number may be supplied after performing task 50.

Following task 50, item-leasing segment 36 performs a task 54. Task 54 involves the obtaining of insurance for loss or damage to item 10. Insurance is obtained to limit risks to merchant 12 in connection with the transaction, but is paid for by customer 14. Task 54 operates in connection with subsequent steps to name merchant 12 as a "loss payee" in the insurance policy to be taken out on item 10. The loss payee is the entity which receives an insurance pay-out in the event of the loss of or damage to item 10.

A query task 56 determines whether the insurance is to be provided through the assistance of merchant 12 or by customer 14. When customer 14 is to provide the insurance, a task 58 is performed when customer 14 purchases the insurance and provides merchant 12 evidence, such as a certificate, of the insurance naming merchant 12 as the loss payee. Such insurance may be obtained as a rider to a home owner's policy owned by customer 14.

In the preferred embodiment, merchant 12 need not directly provide insurance, but may collaborate with a third party to provide the insurance. Thus, when task 56 determines that merchant assisted insurance is desired, a task 60 is performed to calculate the amount due for the insurance coverage for a predetermined period of time, typically one year. This amount may be based on the value of item 10 and may be recorded in a variables list 62 in lease set-up table 44. Following task 60, a task 64 is performed wherein an insurance application and the fees are eventually forwarded to the third party insurance carrier. The insurance carrier will thereafter provide merchant 12 with evidence of the insurance naming merchant 12 as loss payee.

Following tasks 58 or 64, a task 66 is performed with respect to the above-discussed gemstone identification. In particular, a fee for the process is set and desirably recorded in variables list 62 of lease set-up table 44, and the process is performed. The process need not actually be performed at task 66 but may have been performed earlier or may be performed later. Desirably, an identifying number from the data set created by the gemstone identification process is recorded in item list 52.

After task 66, a task 68 is performed to establish a reserve credit account (RCA) 70 for this transaction. RCA 70 may be linked to lease set-up table 44 through an RCA number 72. FIG. 5 shows only one RCA 70 for one lease. However, a single customer 14 may have a number of leases and corresponding RCA's 70, and merchant 12 may have any number of customers 14.

RCA 70 may have three components, including an unmatched contribution 74, a matched contribution 76, and a matching contribution 78. In general, unmatched and matched contributions 74 and 76 register funds voluntarily contributed to merchant 12 by customer 14. Such funds are voluntarily contributed because customer 14 has no contractual or other legal obligation to do so. Matching contribution 78 represents a register for funds contributed by merchant 12. The sum of all components 74, 76 and 78 represents an RCA total 80, which may be used in a secondary transaction, discussed below. During the secondary transaction, customer 14 may purchase item 10, another item, and/or enter into other leases. RCA 70 is discussed in more detail below.

After task 68, a task 82 establishes a lease term. Desirably, default values cause nearly all transactions to have the same lease term, and that term is characterized by a minimum and maximum duration. In the preferred embodiment, the default values are a minimum lease term of one year and a maximum lease term of 10 years. The lease term is desirably recorded in variables list 62 of lease set-up table 44.

Following task 82, a task 84 calculates an initial lease payment. Lease payments are based on an effective value of item 10. If customer 14 wishes to have lower lease payments, then customer 14 may voluntarily contribute funds to unmatched RCA component 74, and, for the purpose of lease payment calculations, the effective value of item 10 will be reduced by that contribution. Otherwise, the actual value of item 10 is used. After the effective value of item 10 is established for the purpose of lease payment calculations, the initial lease payment may be calculated as a pro-rata portion for the remaining rental cycle. For example, when rental payments are to be made monthly, then initial lease payments may be set to cover the remaining portion of the month in which the transaction takes place. Thereafter, lease payments will be due on the first of each month and will represent rent for the subsequent month.

In addition, lease payments may applied against a variety of expenses. In a typical scenario, a lease payment is allocated to rent, sales tax, and optionally to property tax. Task 84 may also establish percentages by which a given lease payment is allocated against such expenses. The initial lease payment and allocation percentages may be recorded in variables list 62 of lease set-up table 44.

After task 84, a task 86 calculates monthly lease payments to be due on the first of each month and records the value in variables list 62. However, those skilled in the art may utilize different payment periods than the monthly period discussed herein.

Following task 86, a task 88 calculates late charges to be applied if needed and stores these charges in variables list 62. Late charges will be assessed if customer 14 fails to make monthly lease payments on time. Desirably, default values are used so that nearly all transactions have the same late charge rate. In the preferred embodiment, the late charges are assessed at 10% of the monthly lease payment.

After task 88, a task 90 sets a purchase price. As discussed above, this price is desirably set sufficiently high so that the theft of item 10 would be considered a felony. If the actual fair market value of item 10 is not sufficiently high, then this transaction is not entered into by merchant 12. The purchase price may, and desirably does, represent the total value set forth in item list 52. It is stored in variables list 62.

Following task 90, a task 92 assigns a transaction date and lease number to this transaction, and these elements are recorded in an identification list 94 of lease set-up table 44. The transaction date is the date on which this transaction is occurring. The lease number is an identification number for this transaction which uniquely distinguishes this transaction from other similar transactions.

Next, a task 96 is performed to print a lease agreement, execute the agreement, and mark the lease as being active. The lease is marked as being active by making appropriate entries in identification list 94 of lease set-up table 44. The lease agreement may be printed at an output device 26 (FIG. 2) or may be delivered over the Internet, via E-mail, via facsimile, or using other means for printing at a location advantageous to the operation of an efficient market. The lease agreement is typically executed by being signed by a representative of merchant 12 and by customer 14. However, other signature techniques, such as the use of electronically transmitted digital signatures, may be used as alternates.

Figure 6:
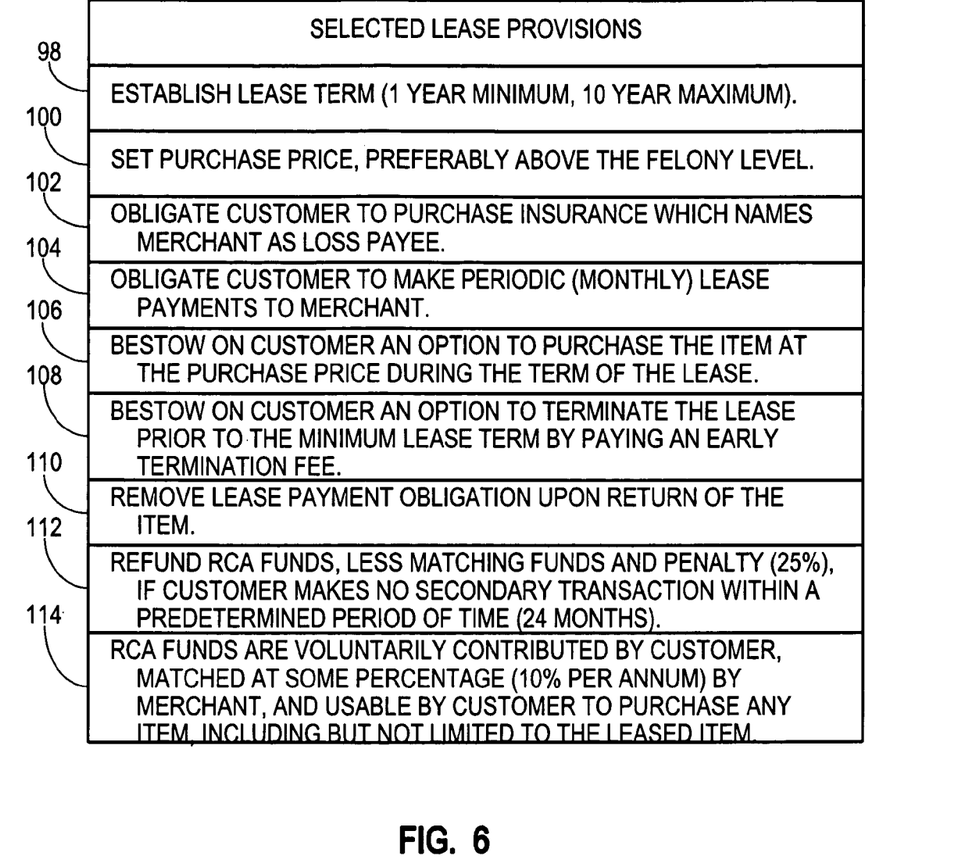
FIG. 6 shows a table summarizing selected lease provisions desirably included in a lease agreement which results from the item-leasing segment of the ownership management process.

FIG. 6 shows a table summarizing selected lease provisions desirably included in the lease agreement printed during task 96. Some of these provisions result from data calculated and collected during item-leasing segment 36, as discussed above. Thus, provisions 98 and 100 respectively set forth the lease term and purchase price, and provision 102 obligates customer 14 to purchase insurance naming merchant 12 as the loss payee.

Although not specifically discussed above, a provision 104 obligates customer 14 to make specified periodic lease payments to merchant 12. In the preferred embodiment, such payments are to be made monthly. A provision 106 bestows on customer 14 an option to purchase item 10 at the purchase price set forth in provision 100 during the term of the lease. A provision 108 bestows on customer 14 an option to terminate the lease prior to the occurrence of the minimum lease term set forth in provision 98 by paying merchant 12 an early termination fee. A provision 110 removes the monthly lease payment obligation upon the customer's return of item 10. A provision 112 obligates merchant 12 to return RCA funds, less any matching funds and a penalty, which is 25% in the preferred embodiment, if customer 14 fails to enter into a secondary transaction within a predetermined period of time after deactivating the lease. In the preferred embodiment, that period of time is set at twenty four months. And, a provision 114 clarifies that RCA funds, unlike lease payments, are to be voluntarily contributed by customer 14, matched at a specified percentage rate by merchant 12, and usable as legal tender in a secondary transaction with merchant 12. In the preferred embodiment, that matching percentage is specified as being 10% per annum, or 0.8333% monthly. Of course, the agreement may include many other provisions typically included in lease agreements but not summarized in FIG. 6, and the agreement need not utilize the exact wording illustrated in FIG. 6.

After task 96, program flow proceeds from item-leasing segment 36 to a task 116 of process 32 (FIG. 3). Task 116 collects and posts the initial payment from customer 14 and transfers the right to use and possess item 10 to customer 14. The initial payment may include funds for the initial lease payment discussed above in connection with task 84, insurance as discussed above in connection with task 60, the gemstone identification process as discussed above in connection with task 66, and voluntary RCA payments discussed above in connection with task 68. The initial lease payment may be posted by allocating the respective portions of the payment to rent, sales tax and property tax registers in association with a date stamp in a payment history table 118 of database 38 (FIG. 5). Payment history table 118 may be linked to lease set-up table 44 through a payment history number 120. Initial voluntary RCA payments may be posted by recording appropriate entries in RCA 70 with a date stamp. To the extent that voluntary RCA payments are used to lower lease payments over the term of the lease, such voluntary RCA payments will be classified as unmatched contribution 74. Otherwise, such voluntary RCA payments will be classified as a matched contribution 76.

After task 116 or when task 34 determines that no primary transaction is occurring, a query task 119 is performed. Task 119 determines whether the current time is appropriate for constructing and sending monthly statements to customers 14. In the preferred embodiment, this occurs on the $20^{th}$ of each month. At the scheduled statement-preparation date, a task 120 is performed to record RCA matching funds.

RCA matching funds need not be allocated in connection with making statements, but simply may be allocated in accordance with some schedule, and the statement schedule may be convenient. As discussed above, merchant 12 makes a matching contribution to RCA's. In the preferred embodiment, that contribution is at a rate of 10% per annum of the total matched funds in a customer's RCA 70 (FIG. 5). This matching contribution encourages customers 14 to make voluntary payments to their RCA's. Accordingly, for all RCA's in database 38 (FIG. 5), task 120 records an accumulation of funds in matching RCA contribution 78 (FIG. 5) with a date stamp. This causes a further accumulation of funds for the benefit of a customer 14 beyond those funds voluntarily contributed by the customer 14. Since, in the preferred embodiment, this further accumulation is performed monthly, matching funds are contributed at a rate of 0.83333% of the total matched RCA contribution 76 (FIG. 5).

Those skilled in the art should appreciate that the recording of funds in RCA 70, and particularly the recording of matching contribution funds 78, does not necessarily imply a transaction in which money changes hands or is otherwise moved around. At this point, the recording of such funds is merely a computer entry that need not actually involve the transfer of money.

Following task 120, a task 122 is performed to print statements for all leases. Accordingly, for all active leases recorded in database 38 (FIG. 5), task 122 finds the transaction date, monthly lease payment, current total RCA amount 80 (FIG. 5), and funds needed to purchase item 10 (i.e., the purchase amount) and prints a statement which conveys this data to customer 14. However, active leases which are past due or near default may be omitted during task 122 because they will be processed in a different manner, discussed below. Of course, additional data may also be presented, and the statement may be printed either to paper or to a computer file. The printing of the RCA amount and purchase amount lets customer 14 know whether he or she has sufficient RCA funds to purchase item 10 should customer 14 wish to do so. However, customer 14 is under no obligation to use his/her RCA funds to purchase item 10. Thus, the statement printed at task 122 serves two functions. The first function is to remind customer 14 of an upcoming lease payment for item 10 and the amount thereof. The second function is to inform customer 14 of his or her RCA amount and its relationship to the purchase price for item 10.

Following task 122, a task 124 is performed to send the statement to customer 14 using any convenient technique, such as snail mail, E-mail, facsimile, and the like.

In the normal course of events, customer 14 will send a lease payment and optionally include a voluntary RCA contribution in response to the statement sent in task 124. Hence, after task 124 or when task 119 determines that statements are not to be prepared now, a query task 126 is performed to determine whether such a payment has been received from a customer 14. If a payment has been received, then a post payment segment 128 of process 32 is performed.

Figure 7:
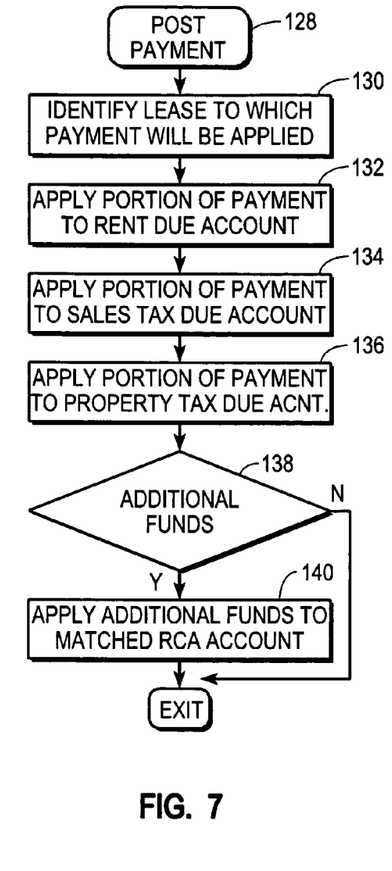
FIG. 7 shows a flow chart of a post payment segment of the ownership management process.

FIG. 7 shows a flow chart of post payment segment 128. During segment 128, a task 130 identifies the lease to which a payment will be applied. The lease is desirably identified by lease number, customer name, or the like. After identifying the lease, a task 132 applies a portion of the payment to a rent due account, a task 134 applies another portion of the payment to a sales tax due account, and an optional task 136 applies yet another portion to a property tax due account. Assuming that rent is due when a payment is received, such rent and associated tax portions are not voluntary because customer 14 is contractually obligated to make them. The portions may be determined in accordance with the rental, sales tax and property tax percentages listed in variables list 62 of database 38 for the subject lease. Of course, nothing requires any portion of a payment to be applied toward rent or associated taxes, if no rent is due. Thus, if a payment is received but no rent is due yet, then no portion of such a payment will be allocated to rent or tax.

After task 136, a query task 138 determines whether any additional funds remain after the applications of tasks 132, 134 and 136. If additional funds remain, then such additional funds are assumed to be voluntary RCA contributions, and a task 140 applies the remaining amount to matched RCA contribution 76 for the subject lease. Of course other accounts, such as a cash account, may also be credited with the RCA contribution. Following task 140 and when task 138 determines that no additional funds are present, program flow exits segment 128.

Referring back to FIG. 3, following segment 128 and when task 126 determines that no customer payment has been received, a task 142 determines whether the current time is appropriate for constructing and sending past due notices to customers 14 who have failed to make monthly lease payments on time. In the preferred embodiment, this occurs on the $5^{th}$ of each month. At the scheduled past due notice preparation date, a task 144 is performed to print past due notices for all past due leases. Accordingly, task 144 evaluates all active leases recorded in database 38 (FIG. 5) to determine whether they are past due. If so, a past due amount may be calculated and stored in variables list 62 of database 38 for the identified leases. Then, task 144 prints past due notices which include the data included on the statements, discussed above in connection with task 122, along with an indication of the late fee and the total lease payment now due. Of course, additional data may also be presented, and the past due notices may be printed either to paper or to a computer file. Following task 144, a task 146 is performed to send the past due notices to customers 14.

After task 146 or when task 142 determines that past due notices are not to be prepared now, a query task 148 is performed to determine whether the current time is appropriate for constructing and sending monthly default notices to customers 14 who have failed to make monthly lease payments even after being notified of being past due. In the preferred embodiment, this occurs on the $20^{th}$ of each month. At the scheduled default notice preparation date, a task 150 is performed to print default notices for all past due leases. Accordingly, task 150 evaluates all active leases recorded in database 38 (FIG. 5) to determine whether they remain past due. Then, task 150 prints default notices which include the data included on the past due notices, discussed above in connection with task 144, along with a strongly worded warning concerning the default. In addition, the amount due may be increased to reflect an additional month's lease payment plus the previous month's lease payment and late payment therefor. Of course, additional data may also be presented, and the default notices may be printed either to paper or to a computer file. Following task 150, a task 152 is performed to send the default notices to customers 14.

After task 152 or when task 148 determines that default notices are not to be prepared now, a query task 154 is performed to determine whether the current time is appropriate for constructing and sending forced termination notices to customers 14 who continue to fail to make monthly lease payments even after being notified of being past due and in default. In the preferred embodiment, this occurs on the $5^{th}$ of each month. At the scheduled termination notice preparation date, a task 156 is performed to print termination notices for all leases in default. Accordingly, task 156 evaluates all active leases recorded in database 38 (FIG. 5) to determine whether they are in default. Of course, nothing requires task 156 to find any leases to be in default. However, for any leases which are is default, task 156 prints termination notices which indicate that the customer's lease contract has been terminated and other strongly worded provisions which demand immediate return of item 10 and/or inform customer 14 of the consequences of failing to do so.

Following task 156, a task 158 is performed to send the termination notices and to begin the process of recovering item 10. The recovery process may include a letter writing campaign, turning the matter over to repossession professionals, and/or informing governmental authorities about the theft of the merchant's rental property. Since the value of item 10 is set at the felony level, this makes the theft thereof by failing to pay lease payments a serious matter which can lead to serious penal consequences. The felonious nature of the theft can work as an additional inducement in the recovery process whether or not criminal legal proceedings are instituted.

After task 158 or when task 154 determines that termination notices are not to be prepared now, a query task 160 is performed to determine whether a voluntary lease termination is being requested. A voluntary lease termination occurs when customer 14 returns item 10 to merchant 12 and requests termination of the lease. When a voluntary termination is being requested, a deactivate lease segment 162 of process 32 is performed.

Figure 8:
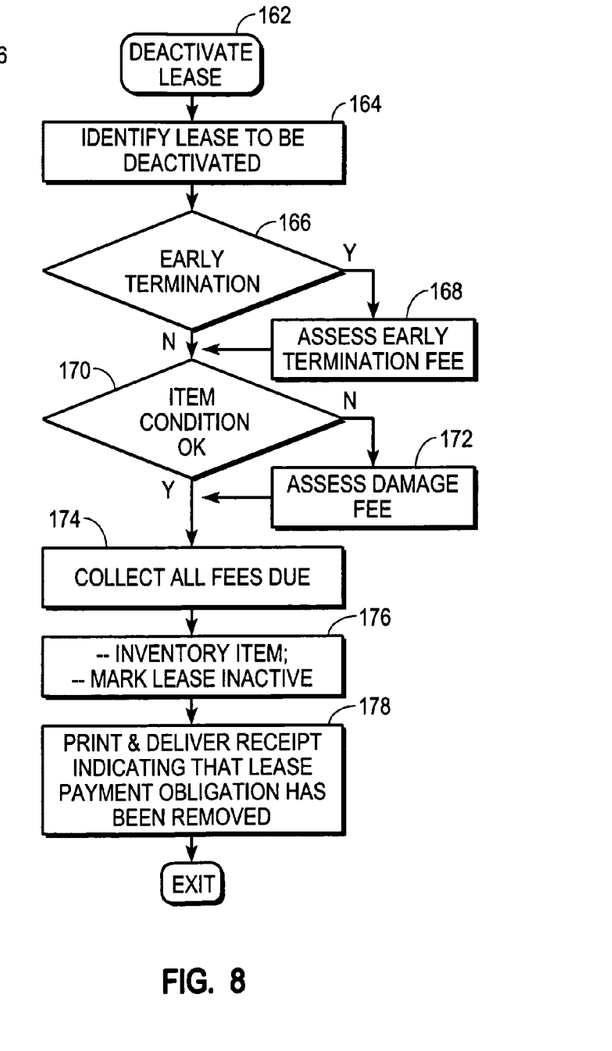
FIG. 8 shows a flow chart of a deactivate lease segment of the ownership management process.

FIG. 8 shows a flow chart of deactivate lease segment 162. Segment 162 performs a task 164 to identify the lease to be deactivated using a lease number, customer identity data, or the like. After identifying the lease, a query task 166 determines whether this voluntary termination is an early termination. An early termination is one that occurs before the minimum lease term, which is one year in the preferred embodiment. The lease agreement desirably imposes an early termination fee, which is equal to a one month lease payment or $50, whichever is greater, in the preferred embodiment. Accordingly, when an early voluntary termination is encountered, a task 168 assesses the early termination fee.

Following task 168 or when task 166 determines that no early voluntary termination is being encountered, a query task 170 is performed. Task 170 investigates the condition of item 10. Desirably, the lease agreement imposes damage fees if item 10 is returned in a damaged condition. Accordingly, if item 10 is discovered to have been damaged, a task 172 is performed to assess a damage fee. Of course, task 172 may be performed so as to take into account whether an insurance pay-out may be available to partially cover the damage.

After task 172 or when task 170 determines that the condition of item 10 is acceptable, a task 174 is performed to collect all fees due from customer 14. The fees that may be due include any assessments from tasks 168 and 172, along with any past due lease payments and late fees associated therewith. Following task 174, a task 176 causes item 10 to be listed in the inventory of merchant 12 and the lease is marked as being inactive. The lease may be marked as being inactive by making an appropriate entry, along with a date stamp in identification list 94 of database 38 (FIG. 5).

At this point, the lease is terminated and the customer's payment obligation to merchant 12 has been removed. Accordingly, a task 178 then prints and delivers a receipt to customer 14 indicating this fact. After task 178, program flow exits deactivate lease segment 162.

Figure 9:
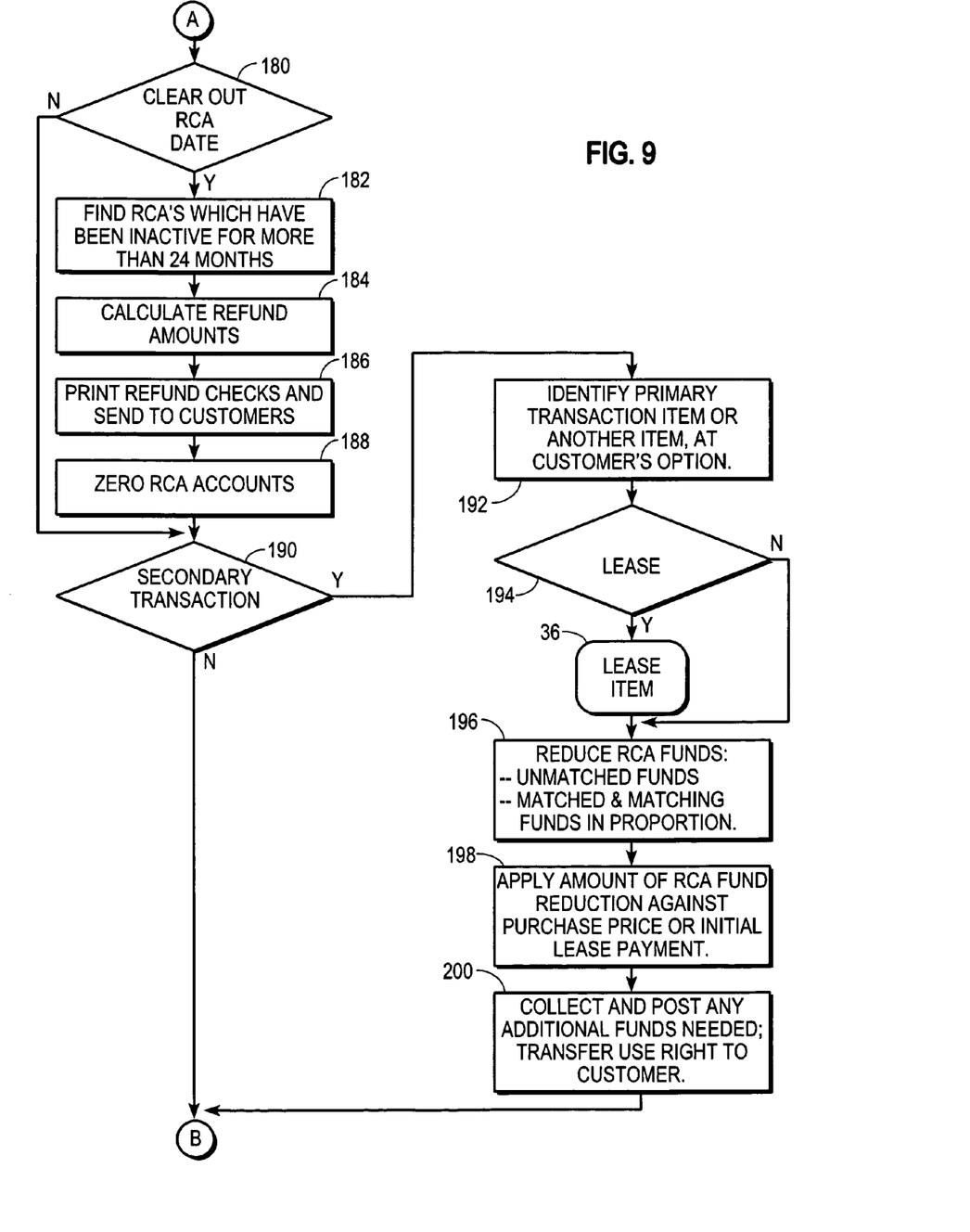
FIG. 9 shows a flow chart of a second portion of the ownership management process.

FIG. 9 shows a flow chart of a second portion of ownership management process 32. After the completion of deactivate lease segment 162 (FIGS. 3 and 8) or when task 160 (FIG. 3) determines that no voluntary termination is being requested, program flow proceeds to a query task 180. Task 180 determines whether the current time is appropriate for clearing out inactive RCA's. Any convenient schedule, such on the 15$^{th}$ of each month, may be implemented through task 180. When the time has arrived to clear-out inactive RCA's, a task 182 is performed to identify all RCA's which are associated with leases that have been inactive for a predetermined duration, which is twenty-four months in the preferred embodiment.

When such inactive RCA's have been identified, a task 184 calculates refund amounts. Desirably, the lease agreements for which such RCA's were established indicate that refunds will be made only for unmatched and matched contributions 74 and 76 (FIG. 5) of RCA 70 (i.e., not matching contribution 78 (FIG. 5)), and that an additional penalty would be assessed before refunding the RCA account, as summarized by provision 112 (FIG. 6). That additional penalty is set at 25% in the preferred embodiment.

Following task 184, a task 186 prints refund checks for the calculated amounts and causes the checks to be sent to the respective customers 14. Next, a task 188 zeros the RCA's which are subject to being cleared out. Accordingly, tasks 182, 184, 186, and 188 serve two functions. They motivate customers 14 to utilize their RCA's in making secondary transactions, discussed below, and they provide a mechanism wherein merchant 12 maintains ultimate control over its liability accounts. No liability due to a customer RCA needs to extend for longer than twenty four months following the inactivation of a lease.

Following task 188 and when query task 180 determines that the RCA clear-out date is not present, a query task 190 is performed to determine whether a secondary transaction is occurring. A secondary transaction is a transaction between merchant 12 and customer 14 in which customer 14 will apply at least a portion of the customer's RCA funds in lieu of a monetary transfer to merchant 12 in return for some item, including but not limited to item 10.

When a secondary transaction is occurring, a task 192 identifies the item which is the subject of the secondary transaction. This item may be item 10 or another item offered by merchant 12, and customer 14 has the option of selecting the subject item. If item 10 is selected, then the purchase price has been previously set in a lease covering item 10 and customer 14 gets the benefit of any appreciation in the fair market value of item 10. If another item is selected, then the purchase price is determined as of the date of the secondary transaction in the normal manner.

After task 192, a query task 194 determines whether this secondary transaction is to be a lease transaction. If a lease transaction is to occur, then item-leasing segment 36 (FIG. 4) is repeated for the subject item. If the secondary transaction is not to be a lease, then it may be a simple purchase, financing arrangement, or the like. In this situation, the transaction proceeds in a conventional manner to the point of collecting funds from customer 14. After the completion of item-leasing segment 36 or when a different type of transaction has proceeded to the funds collection stage, a task 196 is performed.

In task 196, the customer's RCA funds are reduced, up to the amount of funds which customer 14 needs to provide merchant 12 in the secondary transaction. Desirably, unmatched contribution funds 74 are applied first, then matched contribution funds 76 and matching contribution funds 78 applied in proportion to one another. Then, in a task 198, the amount by which the customer's RCA funds have been reduced in task 196 is applied against the purchase price or initial lease payment for the subject item in the secondary transaction. Following task 198, a task 200 collects and posts any additional funds that are needed in the transaction from customer 14, and the affected ownership rights are transferred to customer 14 to complete the secondary transaction.

Following task 200 and when task 190 determines that no secondary transaction is occurring, program flow eventually returns to task 34 (FIG. 3), as indicated by connector "B".

In summary, the present invention provides an improved process for managing the ownership of a valuable item. A computer system is useful in managing the ownership of valuable items about which a merchant has certain ownership rights and customers have certain future obligations and ownership rights. An ownership management process improves the efficiency with which the markets for certain valuable items operate. In particular, this process allows a merchant to receive adequate compensation while pricing certain items low and still obligating customers to make future payments. Lower prices yield suitable results for merchants at least in part because the risk of customer bankruptcy is diminished. If a customer declares bankruptcy, the ownership right of title (i.e., basic ownership) for the item remains with the merchant, and the lease cannot be converted into an installment sale. Moreover, this process allows a customer to have immediate possession and use of certain items, gives the customer flexibility in future dealings concerning the items, and allows the customer to benefit from appreciation of the items.

Although the preferred embodiments of the present invention have been illustrated and described in detail, it will be readily apparent to those skilled in the art that various modifications and equivalents may be made therein without departing from the spirit of the invention or from the scope of the appended claims. For example, the precise dates and time periods discussed above may be altered to meet particular needs.

What is claimed is:

1. A process for managing ownership of a valuable item, said valuable item being one of a first item and another item, said process comprising:
   leasing said first item to a customer in a first financial transaction between a merchant and said customer so that said customer is thereafter obligated to make periodic lease payments to said merchant;
   establishing a reserve credit account (RCA) for said customer with said merchant;
   recording the accumulation of funds in said RCA in response to payments voluntarily given to said merchant by said customer after said first financial transaction, said establishing and recording operations being performed using a computer system;
   engaging in a second financial transaction between said customer and said merchant, said second financial transaction occurring after said first financial transaction and involving said first item and said another item at the option of said customer, and said second financial transaction causing funds recorded in said RCA to be reduced; and
   transferring affected ownership rights of one of said first item and said another item to said customer in response to said second financial transaction.

2. A process as claimed in claim 1 wherein said process additionally comprises setting a purchase price for said item as a part of said first transaction, and said leasing operation comprises:
   establishing a lease term; and
   bestowing upon said customer an option to purchase said first item from said merchant for said purchase price during said lease term.

3. A process as claimed in claim 2 wherein:
   said term-establishing operation establishes a minimum lease term; and
   said bestowing operation bestows upon said customer an option to terminate said lease prior to said minimum lease term upon payment of an early termination fee.

4. A process as claimed in claim 1 additionally comprising recording a further accumulation of funds in said RCA beyond said payments voluntarily given to said merchant by said customer.

5. A process as claimed in claim 1 wherein said first item is substantially non-depreciating.

6. A process as claimed in claim 5 wherein said first item is jewelry.

7. A process as claimed in claim 6 wherein said jewelry includes a gemstone, and said process additionally comprises, as a part of said first transaction, performing a gemstone identification process for said gemstone.

8. A process as claimed in claim 1 wherein said process additionally comprises setting a purchase price for said first item as a part of said first transaction, said purchase price being sufficiently high so that a theft of said first item would be a felony.

9. A process as claimed in claim 1 additionally comprising, as a part of said first transaction, purchasing insurance to cover loss of said first item.

10. A process as claimed in claim 1 additionally comprising, as a part of said first transaction, purchasing insurance to cover loss of said first item, said insurance naming said merchant as a loss payee.

11. A process as claimed in claim 1 wherein said leasing operation comprises:
    establishing a lease term; and
    removing said obligation to make subsequent periodic lease payments upon a return of said first item to said merchant during said lease term.

12. A process as claimed in claim 11 wherein said second transaction is transacted within a predetermined period of time following said return of said first item.

13. A process as claimed in claim 1 additionally comprising occasionally sending statements from said merchant to said customer, said statements indicating quantities of funds recorded in said RCA for said customer.

14. A process as claimed in claim 13 wherein said statements additionally indicate funds needed to purchase said first item by said customer from said merchant.

15. A process as claimed in claim 1 additionally comprising:
    posting lease payments to accounts for rent and sales tax as said lease payments are received.

16. A process for managing ownership of a valuable item, said valuable item being one of a first item and another item, said process comprising the steps of:
    forming a lease agreement for leasing said first item to a customer in a first financial transaction between a merchant and said customer, said lease agreement being configured so that said customer is obligated to make periodic lease payments to said merchant;
    establishing, using a computer system, a reserve credit account (RCA) for said customer with said merchant;
    registering, using said computer system, the accumulation of funds in said RCA in response to voluntary payments received by said merchant from said customer after said first financial transaction;
    recording, using said computer system, a second financial transaction between said customer and said merchant, said second financial transaction occurring after said first financial transaction, said second financial transaction involving said first item and said another item at the option of said customer, and said second financial transaction causing funds recorded in said RCA to be reduced; and
    transferring affected ownership rights of one of said first item and another item to said customer in response to said second financial transaction.

17. A process as claimed in claim 16 wherein said registering step registers an accumulation of funds in said RCA beyond said payments voluntarily received by said merchant from said customer.

18. A process as claimed in claim 16 wherein said forming step is configured so that said lease agreement establishes a lease term, sets a purchase price for said first item, removes said obligation to make periodic lease payments upon a return of said first item to said merchant during said lease term, and bestows upon said customer an option to purchase said first item from said merchant for said purchase price during said lease term.

19. A process as claimed in claim 16 additionally comprising the step of occasionally sending statements to said customer, said statements indicating quantities of funds in said RCA for said customer.

20. A process for managing ownership of a valuable item, said valuable item being one of a first item and another item, said process comprising:

leasing said first item to a customer in a first financial transaction between a merchant and said customer so that a lease term is established, a purchase price for said first item is set, said customer is obligated to make periodic lease payments to said merchant, said customer has an option to purchase said first item from said merchant for said purchase price during said lease term, and said obligation to make subsequent periodic lease payments is removed upon a return of said first item to said merchant during said lease term;

establishing, in a computer system, a reserve credit account (RCA) for said customer with said merchant;

recording, using said computer system, the accumulation of funds in said RCA in response to payments voluntarily given to said merchant by said customer after said first financial transaction, said funds accumulating to quantities greater than the total of said payments voluntarily given to said merchant by said customer;

posting, using said computer system, said lease payments to accounts for rent and sales tax as said lease payments are received;

sending statements from said merchant to said customer from time to time, said statements indicating quantities of funds recorded in said RCA for said customer;

engaging in a second financial transaction between said customer and said merchant, said second financial transaction occurring after said first financial transaction, said second financial transaction involving said first item and said another item at the option of said customer, and said second financial transaction causing funds recorded in said RCA of said computer system to be reduced; and transferring affected ownership rights of one of said first item and another item to said customer in response to said second financial transaction.

* * * * *